United States Patent
Yoo et al.

(10) Patent No.: US 10,344,835 B2
(45) Date of Patent: Jul. 9, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Ilhan Yoo, Seongnam-si (KR); Seongwook Ji, Gunpo-si (KR); Juhyeon Park, Suwon-si (KR); Hyun Sik Kwon, Seoul (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 6 days.

(21) Appl. No.: 15/834,836

(22) Filed: Dec. 7, 2017

(65) Prior Publication Data

US 2019/0078659 A1 Mar. 14, 2019

(30) Foreign Application Priority Data

Sep. 13, 2017 (KR) .......................... 10-2017-0117417

(51) Int. Cl.
*F16H 3/66* (2006.01)
*F16H 3/44* (2006.01)

(52) U.S. Cl.
CPC .......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ........ F16H 3/44; F16H 3/66; F16H 2003/005; F16H 2200/2012; F16H 2200/2041; F16H 2200/2046; F16H 2037/047; F16H 2037/048
See application file for complete search history.

(56) References Cited

U.S. PATENT DOCUMENTS

| 9,175,748 B2 | 11/2015 | Goleski et al. |
| 2011/0045943 A1* | 2/2011 | Gumpoltsberger ....... F16H 3/66 475/275 |

* cited by examiner

*Primary Examiner* — Mark J Beauchaine
(74) *Attorney, Agent, or Firm* — Slater Matsil, LLP

(57) ABSTRACT

A planetary gear train of an automatic transmission is disclosed. The planetary gear train includes an input shaft receiving torque of an engine and an output shaft outputting torque. A first planetary gear set includes first, second, and third rotation elements, a second planetary gear set includes fourth, fifth, and sixth rotation elements, a third planetary gear set includes seventh, eighth, and ninth rotation elements, and a fourth planetary gear set including tenth, eleventh, and twelfth rotation elements. Each of a first plurality of shafts is fixedly connected with one of the rotation elements from the first, the second, the third, and the fourth planetary gear sets. A second plurality of shafts is formed by combinations of remaining rotation elements of the first, the second, and the fourth planetary gear sets that are not connected to the first plurality of shafts, and selectively and respectively connected to a transmission housing.

15 Claims, 2 Drawing Sheets

FIG. 2

| Speed stage | Engaging element | | | | | | Gear ratio |
|---|---|---|---|---|---|---|---|
| | C1 | C2 | C3 | C4 | B1 | B2 | |
| D1 | | ● | | | ● | ● | 7.075 |
| D2 | | ● | | ● | | ● | 3.706 |
| D3 | | ● | ● | | | ● | 2.416 |
| D4 | ● | ● | | | | ● | 1.712 |
| D5 | ● | | ● | | | ● | 1.487 |
| D6 | ● | | | ● | | ● | 1.075 |
| D7 | ● | ● | | ● | | | 1.000 |
| D8 | ● | | | ● | ● | | 0.900 |
| D9 | ● | | ● | | ● | | 0.656 |
| D10 | ● | ● | | | ● | | 0.601 |
| REV | | ● | | ● | ● | | -2.624 |

PLANETARY GEAR TRAIN OF AUTOMATIC TRANSMISSION FOR VEHICLE

CROSS-REFERENCE TO RELATED APPLICATIONS

This application claims priority to and the benefit of Korean Patent Application No. 10-2017-0117417 filed in the Korean Intellectual Property Office on Sep. 13, 2017, the entire contents of which are incorporated herein by reference.

TECHNICAL FIELD

The present invention relates to an automatic transmission for a vehicle, and in particular to planetary gear train of automatic transmission for vehicles.

BACKGROUND

Recently, increasing oil prices have caused vehicle manufactures all over the word to rush into infinite competition. Particularly in the case of engines, manufactures have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automatic transmission tends to be implemented and the research and development of a planetary gear train capable of implementing more speed stages has also been actively conducted.

A conventional automatic transmission of eight or more speed stages typically includes three or four planetary gear sets and five to seven engaging elements (frictional elements), and thus mountability may be deteriorated due to increase of volume and weight.

In this regard, disposing planetary gear sets in parallel or employing dog clutches instead of wet-type control elements is sometimes attempted. However, such an arrangement may not be widely applicable, and using the dog clutches may deteriorate shift-feel.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a planetary gear train of an automatic transmission for a vehicle that improves power delivery performance and fuel efficiency by achieving at least eleven forward speed stages and at least one reverse speed stage using a minimum number of constituent elements, and improves silent driving by using a driving point positioned at a low engine speed.

A planetary gear train of an automatic transmission for a vehicle according to an exemplary embodiment of the present invention may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft fixedly connected to the third rotation element, the eighth rotation element, and the eleventh rotation element, and selectively connected to the input shaft; a second shaft fixedly connected to the fourth rotation element and selectively connected to the input shaft; a third shaft fixedly connected to the ninth rotation element and fixedly connected to the output shaft; a fourth shaft fixedly connected to the second rotation element; a fifth shaft fixedly connected to the sixth rotation element and the seventh rotation element; and a plurality of shafts formed by combinations of the remaining rotation elements of the first, second, and fourth planetary gear sets that are not connected to the first to fifth shafts, and selectively and respectively connected to a transmission housing.

The plurality of shafts may include: a sixth shaft fixedly connected to the first rotation element, the fifth rotation element, and the twelfth rotation element, and selectively connected to the transmission housing; and a seventh shaft fixedly connected to the tenth rotation element and selectively connected to the transmission housing. The input shaft and the first shaft, the input shaft and the second shaft, the fourth shaft and the fifth shaft, and the second shaft and the fifth shaft may be selectively and respectively connected to each other.

The planetary gear train may further include: four clutches, each selectively connecting any two shafts including the input shaft; and two brakes, each selectively connecting each of the sixth shaft and the seventh shaft to the transmission housing.

The fourth clutches may include: a first clutch disposed between the input shaft and the first shaft; a second clutch disposed between the input shaft and the second shaft; a third clutch disposed between the fourth shaft and the fifth shaft; and a fourth clutch disposed between the second shaft and the fifth shaft. The two brakes may include: a first brake disposed between the sixth shaft and the transmission housing; and a second brake disposed between the seventh shaft and the transmission housing.

The first planetary gear set is a single pinion planetary gear set, the first rotation element is a first sun gear, the second rotation element is a first planet carrier, and the third rotation element is a first ring gear. The second planetary gear set is a single pinion planetary gear set, the fourth rotation element is a second sun gear, the fifth rotation element is a second planet carrier, and the sixth rotation element is a second ring gear. The second planetary gear set is a single pinion planetary gear set, the fourth rotation element is a second sun gear, the fifth rotation element is a second planet carrier, and the sixth rotation element is a second ring gear. The fourth planetary gear set is a single pinion planetary gear set, the tenth rotation element is a fourth sun gear, the eleventh rotation element is a fourth planet carrier, and the twelfth rotation element is a fourth ring gear.

The planetary gear train according to the exemplary embodiment of the present invention may achieve at least ten forward speed stages and at least one reverse speed stage by combining four planetary gear sets being simple planetary gear sets with six engaging elements.

Since a speed stage suitable to an engine speed may be achieved due to multiple speed stages and a driving point positioned at a low engine speed may be used, silent driving may be improved.

In addition, engine driving efficiency may be maximized by achieving multiple speed stages, and power delivery performance and fuel efficiency may be improved.

BRIEF DESCRIPTION OF THE DRAWINGS

FIG. 2 is an operation chart of engaging elements at each speed stage in the planetary gear train according to an exemplary embodiment of the present invention.

DESCRIPTION OF SYMBOLS

Figure 1:
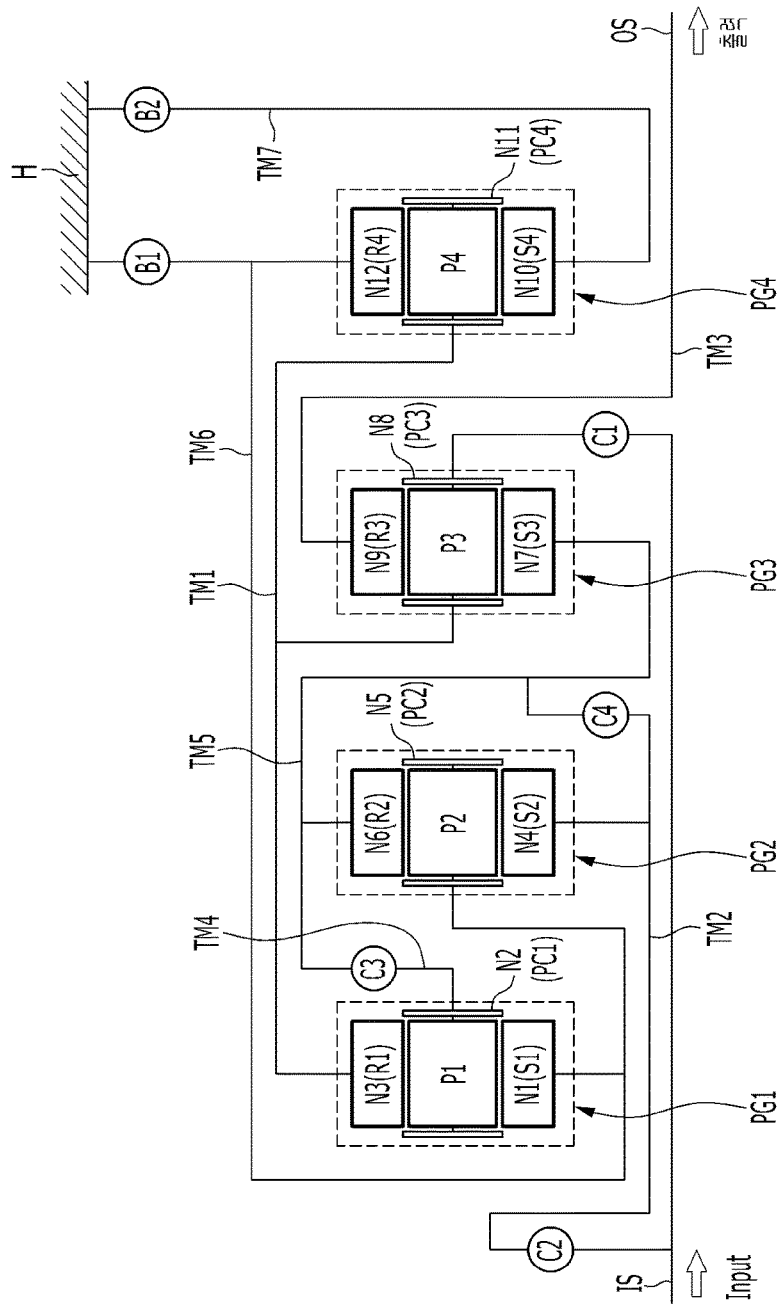
FIG. 1 is a schematic diagram of a planetary gear train according to an exemplary embodiment of the present invention.

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7: first, second, third, fourth, fifth, sixth, and seventh shafts

DETAILED DESCRIPTION OF ILLUSTRATIVE EMBODIMENTS

The present invention relates to an automatic transmission for a vehicle. More particularly, the present invention relates to a planetary gear train of an automatic transmission for a vehicle that may improve power delivery performance and fuel consumption by achieving at least ten forward speed stages using minimum number of constituent elements, and may improve silent driving by using a driving point positioned at a low engine speed.

Hereinafter, an exemplary embodiment of the present invention will be described in detail with reference to accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 disposed on the same axis, an input shaft IS, an output shaft OS, seven shafts TM1 to TM7 connected to at least one of rotation elements of the first, second, third, and fourth planetary gear sets PG1, PG2, PG3, and PG4, six engaging elements including four clutches C1 to C4 and two brakes B1 and B2, and a transmission housing H.

Torque of an engine input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and torque from a crankshaft of the engine is torque-converted through a torque converter to be input to the input shaft IS.

The output shaft OS is an output member, is disposed in parallel with the input shaft IS, and transmit driving torque to a driving wheel through a differential apparatus.

The first planetary gear set PG1 is a single pinion planetary gear set and includes a first sun gear S1, a first planet carrier PC1 rotatably supporting a first pinion gear P1 externally meshed with the first sun gear S1, and a first ring gear R1 internally meshed with the first pinion gear P1 respectively as first, second, and third rotation elements N1, N2, and N3.

The second planetary gear set PG2 is a single pinion planetary gear set and includes a second sun gear S2, a second planet carrier PC2 rotatably supporting a second pinion gear P2 externally meshed with the second sun gear S2, and a second ring gear R2 internally meshed with the second pinion gear P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion gear P3 externally meshed with the third sun gear S3, and a third ring gear R3 internally meshed with the third pinion gear P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion gear P4 externally meshed with the fourth sun gear S4, and a fourth ring gear R4 internally meshed with the fourth pinion gear P4 respectively as tenth, eleventh, and twelfth rotation elements N10, N11, and N12.

The first rotation element N1 is fixedly connected to the fifth rotation element N5 and the twelfth rotation element N12, the third rotation element N3 is fixedly connected to the eighth rotation element N8 and the eleventh rotation element N11, the sixth rotation element N6 is fixedly connected to the seventh rotation element N7, and the first, second, third, and fourth planetary gear sets PG1, PG2, PG3, and PG4 are operated with seven shafts TM1 to TM7.

The seven shafts TM1 to TM9 will be described in further detail.

The first shaft TM1 is fixedly connected to the first ring gear R1, the third planet carrier PC3, and the fourth planet carrier PC4, and is selectively connected to the input shaft IS to be operated as a selective input element.

The second shaft TM2 is fixedly connected to the second sun gear S2 and is selectively connected to the input shaft IS to be operated as a selective input element.

The third shaft TM3 is fixedly connected to the third ring gear R3 and is fixedly connected to the output shaft OS to be continuously operated as an output element.

The fourth shaft TM4 is fixedly connected to the first planet carrier PC1.

The fifth shaft TM5 is fixedly connected to the second ring gear R2 and the third sun gear S3.

The sixth shaft TM6 is fixedly connected to the first sun gear S1, the second planet carrier (PC2), and the fourth ring gear R4.

The seventh shaft TM7 is fixedly connected to the fourth sun gear S4.

Each of seven shafts TM1 to TM7 may fixedly connect at least one rotation element to another rotation element, may be a rotational member rotating with at least one rotation element, or may be a fixed member fixed to the transmission housing H.

Here, the term "fixedly connected" or the like means at least two members are connected to each other to always rotate without rotational speed difference. That is, at least two members that are fixedly connected to each other always rotate with the same rotational speed and in the same rotation direction.

Here, the term "selectively connected" or the like means a plurality of shafts including the input shaft and the output shaft are connectable to each other through at least one of the engaging elements to rotate with the same rotational speed and in the same rotation direction, or are connectable to the transmission housing through at least one of the engaging elements to be fixed to the transmission housing.

In other words, in a case that the engaging element selectively connects a plurality of shafts to each other, the plurality of shafts rotate with the same rotational speed and in the same rotation direction when the engaging element operates but the plurality of shafts are disconnected from each other when the engaging element is released.

In addition, in a case that the engaging element selectively connects any one shaft to the transmission housing, the corresponding shaft is fixedly connected to the transmission housing when the engaging element operates but the corresponding shaft is rotatable when the engaging element is released.

Each of the first shaft TM1 and the second shaft TM2 is selectively connected to the input shaft IS, and the fifth shaft TM5 is selectively connected to each of the second shaft TM2 and the fourth shaft TM4.

In addition, the sixth shaft TM6 and the seventh shaft TM7 are selectively connected to the transmission housing H to be operated as a selective fixed element.

Four clutches C1, C2, C3, and C4 which are engaging elements are disposed at connection portions between any two shafts among shafts IS and TM1 to TM7.

In addition, two brakes B1 and B2 which are engaging elements are disposed at a connection portion between any one shaft among the shafts TM1 to TM7 and the transmission housing H.

Arrangement of the four clutches C1 to C4 and two brakes B1 to B2 will be described in detail.

The first clutch C1 is disposed between the input shaft IS and the first shaft TM1 and selectively causes the input shaft IS and the first shaft TM1 to integrally rotate with each other.

The second clutch C2 is disposed between the input shaft IS and the second shaft TM2 and selectively causes the input shaft IS and the second shaft TM2 to integrally rotate with each other.

The third clutch C3 is disposed between the fourth shaft TM4 and the fifth shaft TM5 and selectively causes the fourth shaft TM4 and the fifth shaft TM5 to integrally rotate with each other.

The fourth clutch C4 is disposed between the second shaft TM2 and the fifth shaft TM5 and selectively causes the second shaft TM2 and the fifth shaft TM5 to integrally rotate with each other.

The first brake B1 is disposed between the sixth shaft TM6 and the transmission housing H and causes the sixth shaft TM6 to be operated as a selective fixed element.

The second brake B2 is disposed between the seventh shaft TM7 and the transmission housing H and causes the seventh shaft TM7 to be operates as a selective fixed element.

The engaging elements including the first, second, third, and fourth clutches C1, C2, C3, and C4 and the first and second brakes B1 and B2 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control unit can be used as the engaging elements FIG. 2 is an operation chart of engaging elements at each speed stage in the planetary gear train according to an exemplary embodiment of the present invention.

Referring to FIG. 2, three engaging elements among the first, second, third, and fourth clutches C1, C2, C3, and C4 and the first and second brakes B1 and B2 are operated at each speed stage in the planetary gear train according to an exemplary embodiment of the present invention. Shifting processes in the exemplary embodiment of the present invention will be described in further detail.

The second clutch C2 and the first and second brakes B1 and B2 are operated at a first forward speed stage.

In a state that the second shaft TM2 is connected to the input shaft IS by operation of the second clutch C2, torque of the input shaft IS is input to the second shaft TM2.

In addition, the sixth shaft TM6 and the seventh shaft TM7 are operated as the fixed element by operation of first and second brakes B1 and B2. Therefore, the first forward speed stage is achieved and torque of the input shaft IS is output through the output shaft OS connected to the third shaft TM3.

The second and fourth clutches C2 and C4 and the second brake B2 are operated at a second forward speed stage D2.

In a state that the second shaft TM2 is connected to the input shaft IS by operation of second clutch C2 and the second shaft TM2 is fixedly connected to the fifth shaft TM5 by operation of fourth clutch C4, torque of the input shaft IS is input to the second shaft TM2.

In addition, the seventh shaft TM7 is operated as the fixed element by operation of second brake B2. Therefore, the second forward speed stage is achieved and torque of the input shaft IS is output through the output shaft OS connected to the third shaft TM3.

The second and third clutches C2 and C3 and the second brake B2 are operated at a third forward speed stage D3.

In a state that the second shaft TM2 is connected to the input shaft IS by operation of second clutch C2 and the fourth shaft TM4 is connected to the fifth shaft TM5 by operation of third clutch C3, torque of the input shaft IS is input to the second shaft TM2.

In addition, the seventh shaft TM7 is operated as the fixed element by operation of second brake B2. Therefore, the third forward speed stage is achieved and torque of the input shaft IS is output through the output shaft OS connected to the third shaft TM3.

The first and second clutches C1 and C2 and the second brake B2 are operated at a fourth forward speed stage D4.

In a state that the first shaft TM1 is connected to the input shaft IS by operation of first clutch C1 and the second shaft TM2 is connected to the input shaft IS by operation of second clutch C2, torque of the input shaft IS is input to the first shaft TM! and the second shaft TM2.

In addition, the seventh shaft TM7 is operated as the fixed element by operation of second brake B2. Therefore, the fourth forward speed stage is achieved and torque of the input shaft IS is output through the output shaft OS connected to the third shaft TM3.

The first and third clutches C1 and C3 and the second brake B2 are operated at a fifth forward speed stage D5.

In a state that the first shaft TM1 is connected to the input shaft IS by operation of first clutch C1 and the fourth shaft TM4 is connected to the fifth shaft TM5 by operation of third clutch C3, torque of the input shaft IS is input to the first shaft TM1.

In addition, the seventh shaft TM7 is operated as the fixed element by operation of second brake B2. Therefore, the fifth forward speed stage is achieved and torque of the input shaft IS is output through the output shaft OS connected to the third shaft TM3.

The first and fourth clutches C1 and C4 and the second brake B2 are operated at a sixth forward speed stage D6.

In a state that the first shaft TM1 is connected to the input shaft IS by operation of first clutch C1 and the second shaft TM2 is connected to the fifth shaft TM5 by operation of fourth clutch C4, torque of the input shaft IS is input to the first shaft TM1.

In addition, the seventh shaft TM7 is operated as the fixed element by operation of second brake B2. Therefore, the sixth forward speed stage is achieved and torque of the input shaft IS is output through the output shaft OS connected to the third shaft TM3.

The first, second, and fourth clutches C1, C2, and C4 are operated at a seventh forward speed stage D7.

In a state that the first shaft TM1 is connected to the input shaft IS by operation of first clutch C1, the second shaft TM2 is connected to the input shaft IS by operation of second clutch C2, and the second shaft TM2 is connected to the fifth shaft TM5 by operation of the fourth clutch C4, torque of the input shaft Is is input to the first shaft TM1 and the second shaft TM2.

In this case, the first, second, third, and fourth planetary gear sets PG1, PG2, PG3, and PG4 integrally rotate. Therefore, the seventh forward speed stage is achieved. At the seventh forward speed stage, rotation speed that is the same as that of the input shaft IS is output.

The first and fourth clutches C1 and C4 and the first brake B1 are operated at an eighth forward speed stage D8.

In a state that the first shaft TM1 is connected to the input shaft IS by operation of first clutch C1 and the second shaft TM2 is connected to the fifth shaft TM5 by operation of fourth clutch C4, torque of the input shaft IS is input to the first shaft TM1.

In addition, the sixth shaft TM6 is operated as the fixed element by operation of first brake B1. Therefore, the eighth forward speed stage is achieved and torque of the input shaft IS is output through the output shaft OS connected to the third shaft TM3.

The first and third clutches C1 and C3 and the first brake B1 are operated at a ninth forward speed stage D9.

In a state that the first shaft TM1 is connected to the input shaft IS by operation of first clutch C1 and the fourth shaft TM4 is connected to the fifth shaft TM5 by operation of third clutch C3, torque of the input shaft IS is input to the first shaft TM1.

In addition, the sixth shaft TM6 is operated as the fixed element by operation of first brake B1. Therefore, the ninth forward speed stage is achieved and torque of the input shaft IS is output through the output shaft OS connected to the third shaft TM3.

The first and second clutches C1 and C2 and the first brake B1 are operated at a tenth forward speed stage D10.

In addition, the first shaft TM1 is connected to the input shaft IS by operation of first clutch C1 and the second shaft TM2 is connected to the input shaft IS by operation of second clutch C2, torque of the input shaft IS is input to the first shaft TM1 and the second shaft TM2.

In addition, the sixth shaft TM6 is operated as the fixed element by operation of first brake B1. Therefore, the tenth forward speed stage is achieved and torque of the input shaft IS is output through the output shaft OS connected to the third shaft TM3.

The second and fourth clutches C2 and C4 and the first brake B1 are operated at a reverse speed stage REV.

In a state that the second shaft TM2 is connected to the input shaft IS by operation of the second clutch C2 and the second shaft TM2 is connected to the fifth shaft TM5 by operation of fourth clutch C4, torque of the input shaft IS is input to the second shaft TM2.

In addition, the sixth shaft TM6 is operated as the fixed element by operation of first brake B1. Therefore, the reverse speed stage REV is achieved and torque of the input shaft IS is output through output shaft OS connected to the third shaft TM3.

The planetary gear train according to the exemplary embodiment of the present invention may achieve at least ten forward speed stages and at least one reverse speed stage by control of the four planetary gear sets PG1, PG2, PG3, and PG4, four clutches C1, C2, C3, and C4, and two brakes B1 and B2.

Since a speed stage suitable to an engine speed may be achieved due to multiple speed stages and a driving point positioned at a low engine speed may be used, silent driving may be improved.

In addition, engine driving efficiency may be maximized by achieving multiple speed stages, and power delivery performance and fuel efficiency may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft receiving torque of an engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a first shaft fixedly connected to the third rotation element, the eighth rotation element, and the eleventh rotation element, and selectively connected to the input shaft;
   a second shaft fixedly connected to the fourth rotation element and selectively connected to the input shaft;

a third shaft fixedly connected to the ninth rotation element and fixedly connected to the output shaft;
a fourth shaft fixedly connected to the second rotation element;
a fifth shaft fixedly connected to the sixth rotation element and the seventh rotation element; and
a plurality of shafts formed by combinations of remaining rotation elements of the first, the second, and the fourth planetary gear sets that are not connected to any of the first, the second, the third, the fourth, and the fifth shafts, and selectively and respectively connected to a transmission housing.

2. The planetary gear train of claim 1, wherein the plurality of shafts comprise:
a sixth shaft fixedly connected to the first rotation element, the fifth rotation element, and the twelfth rotation element, and selectively connected to the transmission housing; and
a seventh shaft fixedly connected to the tenth rotation element and selectively connected to the transmission housing, wherein the input shaft and the first shaft, the input shaft and the second shaft, the fourth shaft and the fifth shaft, and the second shaft and the fifth shaft are selectively and respectively connected to each other.

3. The planetary gear train of claim 2, further comprising:
four clutches, each selectively connecting any two shafts selected from the group consisting of the first to the seventh shafts and the input shaft; and
two brakes, each selectively connecting each of the sixth shaft and the seventh shaft to the transmission housing.

4. The planetary gear train of claim 3, wherein:
the fourth four clutches comprise
a first clutch disposed between the input shaft and the first shaft;
a second clutch disposed between the input shaft and the second shaft;
a third clutch disposed between the fourth shaft and the fifth shaft; and
a fourth clutch disposed between the second shaft and the fifth shaft, and
the two brakes comprise
a first brake disposed between the sixth shaft and the transmission housing; and
a second brake disposed between the seventh shaft and the transmission housing.

5. The planetary gear train of claim 1, wherein the first planetary gear set is a single pinion planetary gear set, the first rotation element is a first sun gear, the second rotation element is a first planet carrier, and the third rotation element is a first ring gear,
the third planetary gear set is a single pinion planetary gear set, the seventh rotation element is a third sun gear, the eighth rotation element is a third planet carrier, and the ninth rotation element is a third ring gear,
the second planetary gear set is a single pinion planetary gear set, the fourth rotation element is a second sun gear, the fifth rotation element is a second planet carrier, and the sixth rotation element is a second ring gear, and
the fourth planetary gear set is a single pinion planetary gear set, the tenth rotation element is a fourth sun gear, the eleventh rotation element is a fourth planet carrier, and the twelfth rotation element is a fourth ring gear.

6. A planetary gear train of an automatic transmission for a vehicle, comprising:
an input shaft receiving torque of an engine,
an output shaft outputting torque;
a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the first rotation element is fixedly connected to the fifth rotation element and the twelfth rotation element, and selectively connected to a transmission housing,
wherein the third rotation element is fixedly connected to the eighth rotation element and the eleventh rotation element, and is selectively connected to the input shaft,
wherein the fourth rotation element is selectively connected to the input shaft,
wherein the sixth rotation element is fixedly connected to the seventh rotation element and is selectively connected to the second rotation element and the fourth rotation element,
wherein the ninth rotation element is fixedly connected to the output shaft, and
wherein the tenth rotation element is selectively connected to the transmission housing.

7. The planetary gear train of claim 6, further comprising:
four clutches, each selectively connecting the input shaft to any one rotation element or any one rotation element of the first to the tenth rotation elements to another rotation element of the first to the tenth rotation elements; and
two brakes, each selectively connecting each of the tenth rotation element and the twelfth rotation element to the transmission housing.

8. The planetary gear train of claim 7, wherein:
the four clutches comprise
a first clutch disposed between the input shaft and the eighth rotation element;
a second clutch disposed between the input shaft and the fourth rotation element;
a third clutch disposed between the second rotation element and the sixth; and
a fourth clutch disposed between the fourth rotation element and the sixth rotation element,
the two brakes comprise
a first brake disposed between the twelfth rotation element and the transmission housing; and
a second brake disposed between the tenth rotation element and the transmission housing.

9. The planetary gear train of claim 6, wherein the first planetary gear set is a single pinion planetary gear set, the first rotation element is a first sun gear, the second rotation element is a first planet carrier, and the third rotation element is a first ring gear,
the second planetary gear set is a single pinion planetary gear set, the fourth rotation element is a second sun gear, the fifth rotation element is a second planet carrier, and the sixth rotation element is a second ring gear,
the third planetary gear set is a single pinion planetary gear set, the seventh rotation element is a third sun gear, the eight rotation element is a third planet carrier, and the ninth rotation element is a third ring gear, and
the fourth planetary gear set is a single pinion planetary gear set, the tenth rotation element is a fourth sun gear, the eleventh rotation element is a fourth planet carrier, and the twelfth rotation element is a fourth ring gear.

10. A planetary gear train of an automatic transmission for a vehicle, the planetary gear train comprising:
- an input shaft receiving torque of an engine;
- an output shaft outputting torque;
- a first planetary gear set including first, second, and third rotation elements;
- a second planetary gear set including fourth, fifth, and sixth rotation elements;
- a third planetary gear set including seventh, eighth, and ninth rotation elements;
- a fourth planetary gear set including tenth, eleventh, and twelfth rotation elements;
- a first plurality of shafts, each of the first plurality of shafts fixedly connected with one of the rotation elements from the first, the second, the third, and the fourth planetary gear sets, wherein two of the first plurality of shafts are selectively connected to the input shaft, wherein one of the first plurality of shafts is fixedly connected to the output shaft; and
- a second plurality of shafts formed by combinations of remaining rotation elements of the first, the second, and the fourth planetary gear sets that are not connected to the first plurality of shafts, and selectively and respectively connected to a transmission housing.

11. The planetary gear train of claim 10, wherein the first plurality of shafts comprise:
- a first shaft fixedly connected to the third rotation element, the eighth rotation element, and the eleventh rotation element, and selectively connected to the input shaft;
- a second shaft fixedly connected to the fourth rotation element and selectively connected to the input shaft;
- a third shaft fixedly connected to the ninth rotation element and fixedly connected to the output shaft;
- a fourth shaft fixedly connected to the second rotation element; and
- a fifth shaft fixedly connected to the sixth rotation element and the seventh rotation element.

12. The planetary gear train of claim 11, wherein the second plurality of shafts comprise:
- a sixth shaft fixedly connected to the first rotation element, the fifth rotation element, and the twelfth rotation element, and selectively connected to the transmission housing; and
- a seventh shaft fixedly connected to the tenth rotation element and selectively connected to the transmission housing, and wherein the input shaft and the first shaft, the input shaft and the second shaft, the fourth shaft and the fifth shaft, and the second shaft and the fifth shaft are selectively and respectively connected to each other.

13. The planetary gear train of claim 12, further comprising:
- a first clutch disposed between the input shaft and the first shaft;
- a second clutch disposed between the input shaft and the second shaft;
- a third clutch disposed between the fourth shaft and the fifth shaft;
- a fourth clutch disposed between the second shaft and the fifth shaft,
- a first brake disposed between the sixth shaft and the transmission housing; and
- a second brake disposed between the seventh shaft and the transmission housing.

14. The planetary gear train of claim 10, further comprising:
- four clutches, each selectively connecting any two shafts selected from the group consisting of the first and the second plurality of shafts and the input shaft; and
- two brakes, each selectively connecting each of the second plurality of shafts to the transmission housing.

15. The planetary gear train of claim 10, wherein the first planetary gear set is a single pinion planetary gear set, the first rotation element is a first sun gear, the second rotation element is a first planet carrier, and the third rotation element is a first ring gear,
wherein the third planetary gear set is a single pinion planetary gear set, the seventh rotation element is a third sun gear, the eighth rotation element is a third planet carrier, and the ninth rotation element is a third ring gear,
wherein the second planetary gear set is a single pinion planetary gear set, the fourth rotation element is a second sun gear, the fifth rotation element is a second planet carrier, and the sixth rotation element is a second ring gear, and
wherein the fourth planetary gear set is a single pinion planetary gear set, the tenth rotation element is a fourth sun gear, the eleventh rotation element is a fourth planet carrier, and the twelfth rotation element is a fourth ring gear.

* * * * *

UNITED STATES PATENT AND TRADEMARK OFFICE
CERTIFICATE OF CORRECTION

PATENT NO. : 10,344,835 B2  
APPLICATION NO. : 15/834836  
DATED : July 9, 2019  
INVENTOR(S) : Ilhan Yoo et al.

Page 1 of 1

It is certified that error appears in the above-identified patent and that said Letters Patent is hereby corrected as shown below:

In the Claims

In Column 9, Line 32, Claim 4, delete "the fourth four clutches" and insert --the four clutches--.

Signed and Sealed this  
Twenty-eighth Day of April, 2020

Andrei Iancu  
*Director of the United States Patent and Trademark Office*